United States Patent
Geue et al.

(10) Patent No.: US 11,767,858 B2
(45) Date of Patent: Sep. 26, 2023

(54) PUMP, IN PARTICULAR FOR A FLUID CIRCUIT IN A VEHICLE

(71) Applicant: HELLA GMBH & CO. KGAA, Lippstadt (DE)

(72) Inventors: Ingo Geue, Bad Sassendorf (DE); Theodor Hueser, Geseke (DE); Alexander Ruether, Olsberg (DE); Martin Thorn, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/185,337

(22) Filed: Feb. 25, 2021

(65) Prior Publication Data

US 2021/0180609 A1    Jun. 17, 2021

Related U.S. Application Data

(63) Continuation of application No. PCT/EP2019/076589, filed on Oct. 1, 2019.

(30) Foreign Application Priority Data

Oct. 10, 2018 (DE) .................... 10 2018 125 031.2

(51) Int. Cl.
  *F04D 29/42* (2006.01)
  *F04D 13/06* (2006.01)
  (Continued)

(52) U.S. Cl.
  CPC .......... *F04D 29/426* (2013.01); *F04D 13/06* (2013.01); *F04D 29/043* (2013.01); *F04D 29/22* (2013.01);
  (Continued)

(58) Field of Classification Search
  CPC .............. F04D 29/043; F04D 29/5806; F04D 13/0606; F04D 13/064; F04D 29/426;
  (Continued)

(56) References Cited

U.S. PATENT DOCUMENTS

2,809,590 A * 10/1957 Brown ................. H02K 5/1285
  417/357
3,220,349 A * 11/1965 White ................. F04D 29/0416
  417/357
(Continued)

FOREIGN PATENT DOCUMENTS

DE    1528718 A1    6/1969
DE    3803774 A1    8/1989
(Continued)

OTHER PUBLICATIONS

International Search Report dated Feb. 11, 2020 in corresponding application PCT/EP2019/076589.

*Primary Examiner* — Dominick L Plakkoottam
(74) *Attorney, Agent, or Firm* — Muncy, Geissler, Olds & Lowe , P.C.

(57) ABSTRACT

A pump, in particular for a fluid circuit in a vehicle, for example a coolant pump with a multi-part housing which has a pump chamber and a motor chamber, wherein an impeller is disposed in the pump chamber which is driven by a rotor arranged in the motor chamber, and wherein the rotor has a rotor shaft and a rotor body through which the rotor shaft is guided, wherein the rotor has through holes, which interconnect a space of the motor chamber on a first side of the rotor and a space of the motor chamber on a second side of the rotor.

9 Claims, 10 Drawing Sheets

(51) Int. Cl.
  *F04D 29/043*  (2006.01)
  *H02K 1/32*  (2006.01)
  *H02K 11/33*  (2016.01)
  *F04D 29/22*  (2006.01)
  *H02K 5/20*  (2006.01)
  *H02K 9/19*  (2006.01)

(52) U.S. Cl.
  CPC ............... *H02K 1/32* (2013.01); *H02K 5/203*
    (2021.01); *H02K 9/19* (2013.01); *H02K 11/33*
    (2016.01)

(58) Field of Classification Search
  CPC ...... F04D 13/06; F04D 13/0633; F04D 25/06;
    F04D 29/026; F04D 29/046; F04D
    29/0473; F04D 29/061; F04D 29/106;
    F04D 29/22; F04D 29/2222; F04D
    29/5813; F04D 29/588
  See application file for complete search history.

(56) References Cited

U.S. PATENT DOCUMENTS

| | | | | |
|---|---|---|---|---|
| 4,047,847 | A * | 9/1977 | Oikawa | F04D 13/025 417/370 |
| 4,699,573 | A * | 10/1987 | Petrie | F04D 29/026 384/907 |
| 5,997,261 | A * | 12/1999 | Kershaw | F04D 13/064 417/357 |
| 6,570,276 | B1 | 5/2003 | Morel et al. | |
| 10,337,513 | B2 * | 7/2019 | Reul | F04C 2/102 |
| 10,731,653 | B2 * | 8/2020 | Turner | F04D 29/061 |
| 2004/0234395 | A1 * | 11/2004 | Hatano | F04D 13/0673 417/423.1 |
| 2011/0229357 | A1 * | 9/2011 | Shieh | F04D 13/0606 417/423.1 |
| 2014/0144412 | A1 * | 5/2014 | An | H02K 11/33 123/562 |
| 2014/0271279 | A1 * | 9/2014 | Kuba | F04D 13/0606 417/420 |
| 2015/0052936 | A1 * | 2/2015 | Yokoyama | F04C 29/0021 62/470 |
| 2016/0047382 | A1 * | 2/2016 | Torii | H02K 1/278 417/420 |
| 2016/0053769 | A1 * | 2/2016 | Mizukami | F04D 11/00 417/423.14 |
| 2016/0134177 | A1 * | 5/2016 | Itoh | H02K 5/20 105/59 |
| 2019/0353166 | A1 * | 11/2019 | Heitzig | F01P 5/12 |
| 2020/0300250 | A1 * | 9/2020 | Torii | F04D 29/043 |
| 2021/0079920 | A1 * | 3/2021 | Pawellek | F04D 29/043 |

FOREIGN PATENT DOCUMENTS

| | | | |
|---|---|---|---|
| DE | 10051239 A1 | 4/2002 | |
| DE | 60037496 T2 | 6/2009 | |
| DE | 102011055599 A1 | 5/2013 | |
| DE | 102013018840 B3 | 10/2014 | |
| EP | 0569738 A1 | 11/1993 | |
| EP | 0913910 A1 | 5/1999 | |
| EP | 2434160 A1 * | 3/2012 | ............ F04D 13/06 |
| EP | 3179106 A1 | 6/2017 | |

* cited by examiner

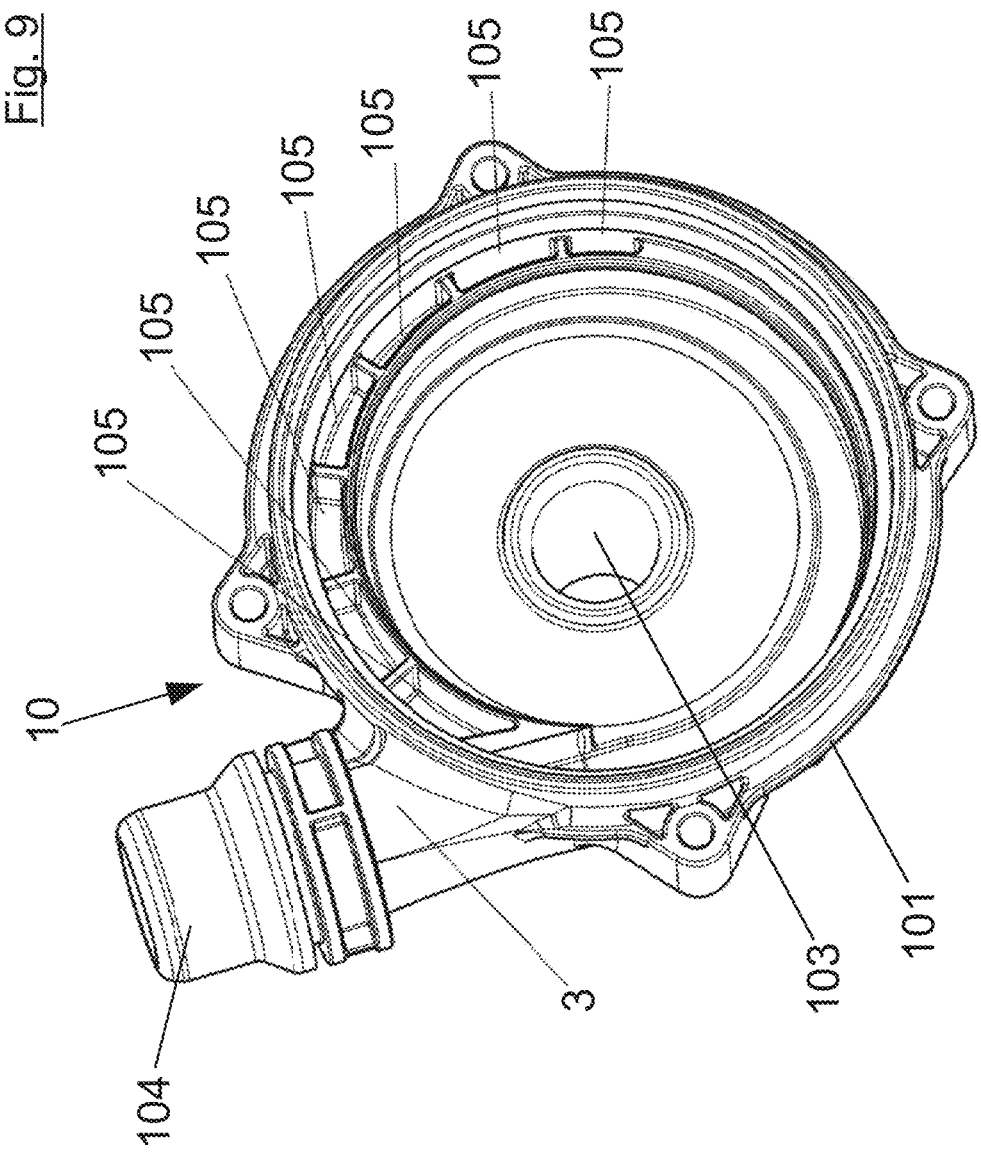

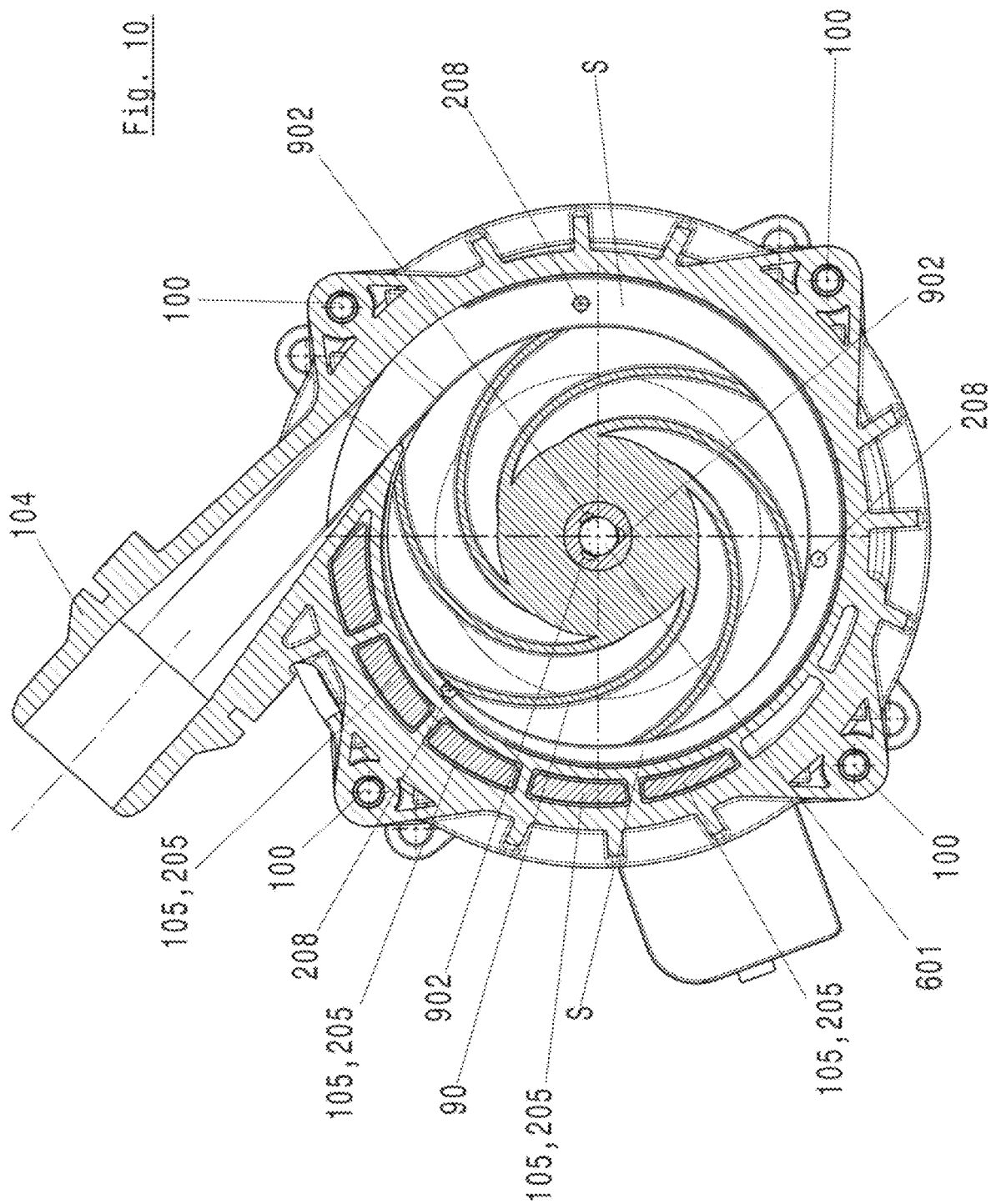

PUMP, IN PARTICULAR FOR A FLUID
CIRCUIT IN A VEHICLE

This nonprovisional application is a continuation of International Application No. PCT/EP2019/076589, which was filed on Oct. 1, 2019, and which claims priority to German Patent Application No. 10 2018 125 031.2, which was filed in Germany on Oct. 10, 2018 and which are both herein incorporated by reference.

BACKGROUND OF THE INVENTION

Field of the Invention

The present invention relates to a pump, in particular for a fluid circuit in a vehicle, for example a coolant pump.

Description of the Background Art

A pump is known from document DE 10 2011 055 599 A1. The latter has a multi-part housing with a pump chamber, a motor chamber and an electronics chamber. An impeller is arranged in the pump chamber and is driven by a motor which is arranged in the motor chamber. An electrical circuit with which the motor can be controlled and/or regulated is provided in the electronics chamber.

The flow of fluid conveyed by a pump can also be used to cool the pump. For this purpose, a part of the fluid flow can be branched off, which is guided to areas of the pump in which heat accumulates, which is carried away by means of the branched fluid circuit. In the case of a pump, as disclosed in document DE 10 2011 055 599 A1, the heat can arise in particular in the motor and in the electronic circuit. So that the heat arising in the motor and the circuit is removed, the branched fluid circuit can preferably be guided through the engine and as close as possible past the circuit. The branched fluid flow can then, for example, be guided through the motor chamber in which a rotor is rotatably disposed. The fluid flow can circulate around the rotor. By the rotation of the rotor in the operation of the pump, the fluid in the motor chamber is also set in rotation.

Due to the rotation of the fluid in the motor chamber, stratification of the fluid in the branched stream and particles or glass bubbles carried by the fluid can occur. Gas bubbles can collect in the center or near the center of the rotating fluid and particles can thereby collect in an outer area. The gas bubbles in particular can restrict the transport of heat away from the motor or away from the circuit.

SUMMARY OF THE INVENTION

It is therefore an object of the present invention to improve the cooling of the motor and the circuit.

This object is achieved in that the rotor has through holes which interconnect a space of the motor chamber on a first side of the rotor and a space of the motor chamber on a second side of the rotor. The through holes can in particular be provided in an area of the rotor outside the rotor shaft. The through holes can be provided in the rotor body and not in the rotor shaft.

The rotor of an inventive pump can have a bush which is provided between the rotor shaft and the rotor body. The bush can be made of metal. This bush can have a through hole in which the rotor shaft is arranged. The rotor body can have a through hole in which the bush is arranged.

The through holes which interconnect the space of the motor chamber on the first side of the rotor and the space of the motor chamber on the second side of the rotor can be provided in the bush.

It is possible that the through holes which interconnect the space of the motor chamber on the first side of the rotor and the space of the motor chamber on the second side of the rotor are at least partially bounded by the rotor shaft.

It is possible that, for example in the wall of the through hole of the bush which accommodates the rotor shaft, or in the wall of the through hole of the rotor body which accommodates the bush, or in an outer wall of the bush, grooves are provided, and the walls of the grooves and the rotor shaft, the bush and/or the rotor body bound the through holes which interconnect the space of the motor chamber on the first side of the rotor and the space of the motor chamber on the second side of the rotor.

The housing of the inventive pump may comprise an annular chamber that surrounds the stator. The stator can thus lie between the motor chamber and the annular chamber.

A fluid connection can exist between the pump chamber, in particular a high-pressure side of the pump chamber, and the annular chamber. Via said connection, a fluid flow for cooling the motor and/or the circuit can be branched off from the pump chamber.

A fluid connection can also exist between the annular chamber and the space of the motor chamber on the first side of the rotor. Via said connection, the fluid flow for cooling the engine and/or the circuit can be further guided into the motor chamber, namely to the first side of the rotor.

The flow of fluid for cooling the motor and/or the circuit can be guided from the first side of the rotor to the second side of the rotor via the first through holes in the rotor.

A fluid connection can also exist between the space of the motor chamber on the second side of the rotor and the pump chamber, in particular a low-pressure side of the pump chamber. The fluid connection can take place through grooves in a through hole through which the rotor shaft is guided.

Via the fluid connection between the space of the motor chamber on the second side of the rotor and the pump chamber, a flow path can result from the pump chamber, in particular the high-pressure side of the pump chamber, via the annular chamber and the motor chamber back to the pump chamber, in particular to the low-pressure side of the pump chamber, via which connection a fluid flow for cooling the motor and/or the circuit can be conveyed.

The housing of an inventive pump may have an electronics chamber, wherein the electrical circuit is provided in the electronics chamber with which the motor can be supplied with electrical power, controlled and/or regulated. The electronics chamber can have a wall that separates the motor chamber from the electronics chamber, wherein the wall has a wall side which bounds the electronics chamber and on which an interconnect device for the electrical circuit rests flat. The flat contact can provide a particularly good transfer of the heat generated in the electronic circuit via the interconnect device into the wall, and from the wall into the fluid in the motor chamber. The heat transfer can be improved by adhesives or thermal pastes, which can, for example, fill a gap between the interconnect device and the wall. Preferably, half or even better ⅔ or more of the interconnect device rests flat against the wall between the motor chamber and the electronics chamber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 9 is a perspective view of a pump housing; and FIG. 10 is a cross section through one of the four illustrated pumps

DETAILED DESCRIPTION

Figure 1:
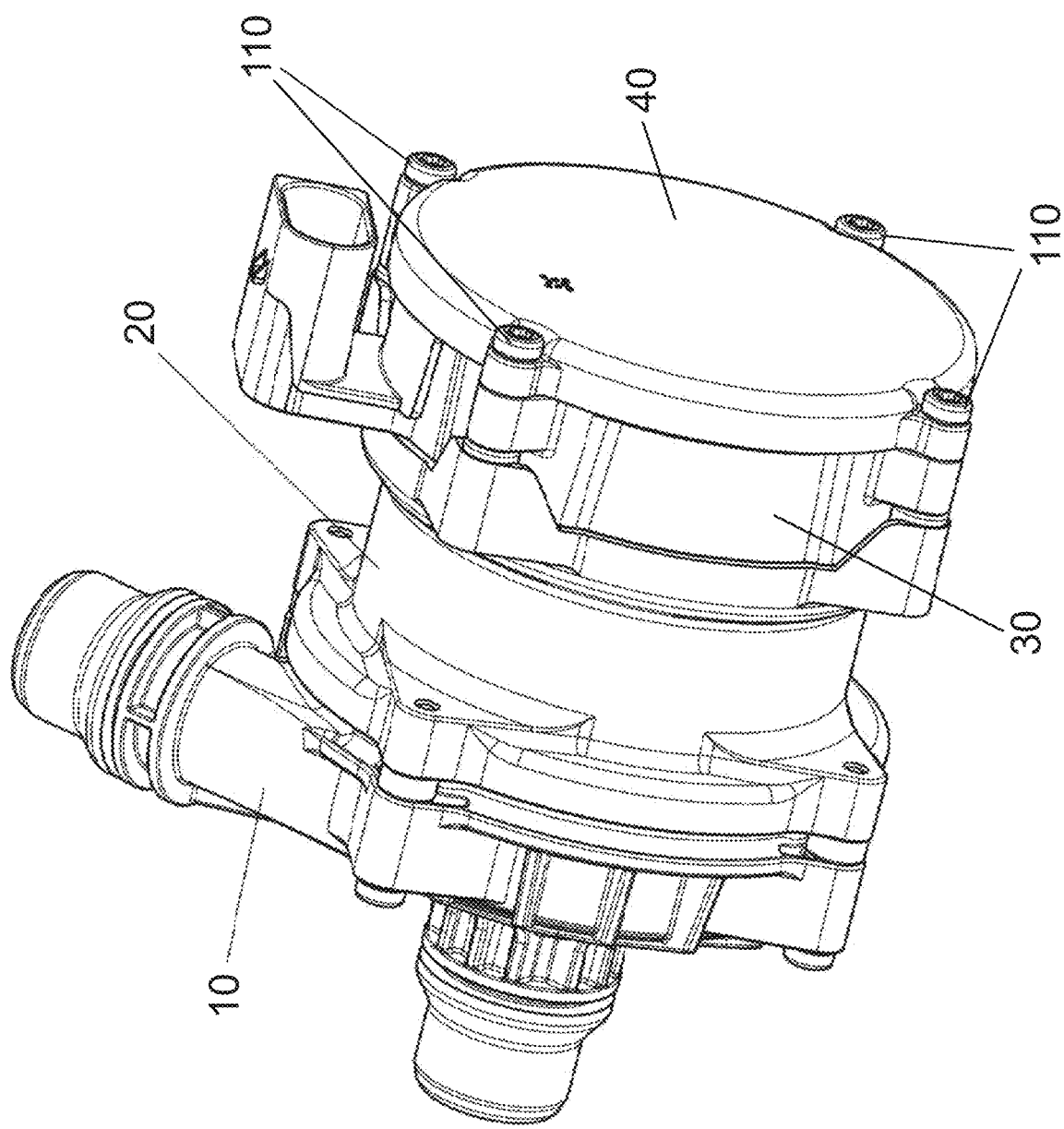
FIG. 1 is a perspective view of an exemplary first pump.
Figure 2:
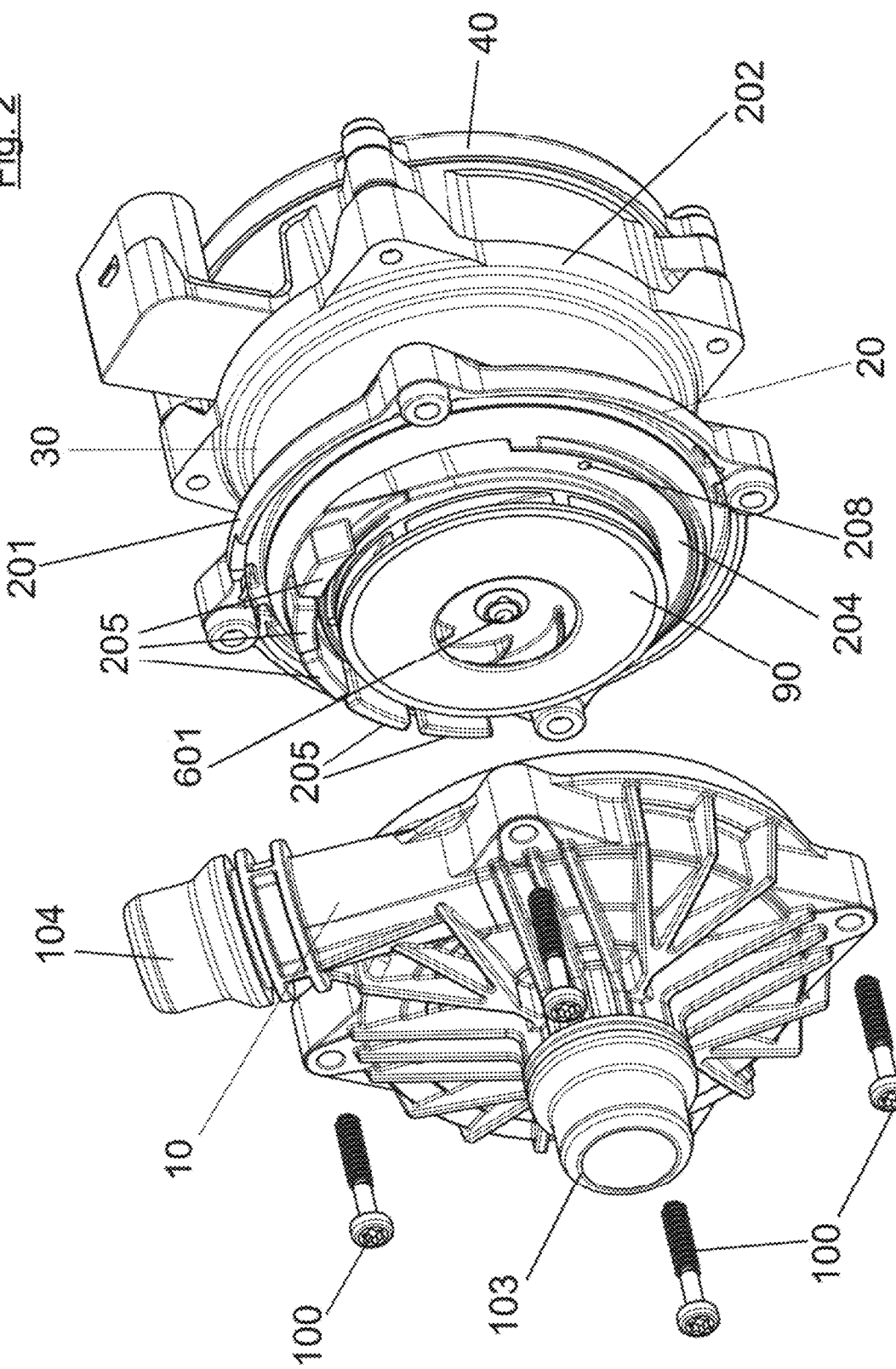
FIG. 2 is an exploded perspective view of the first pump.
Figure 3:
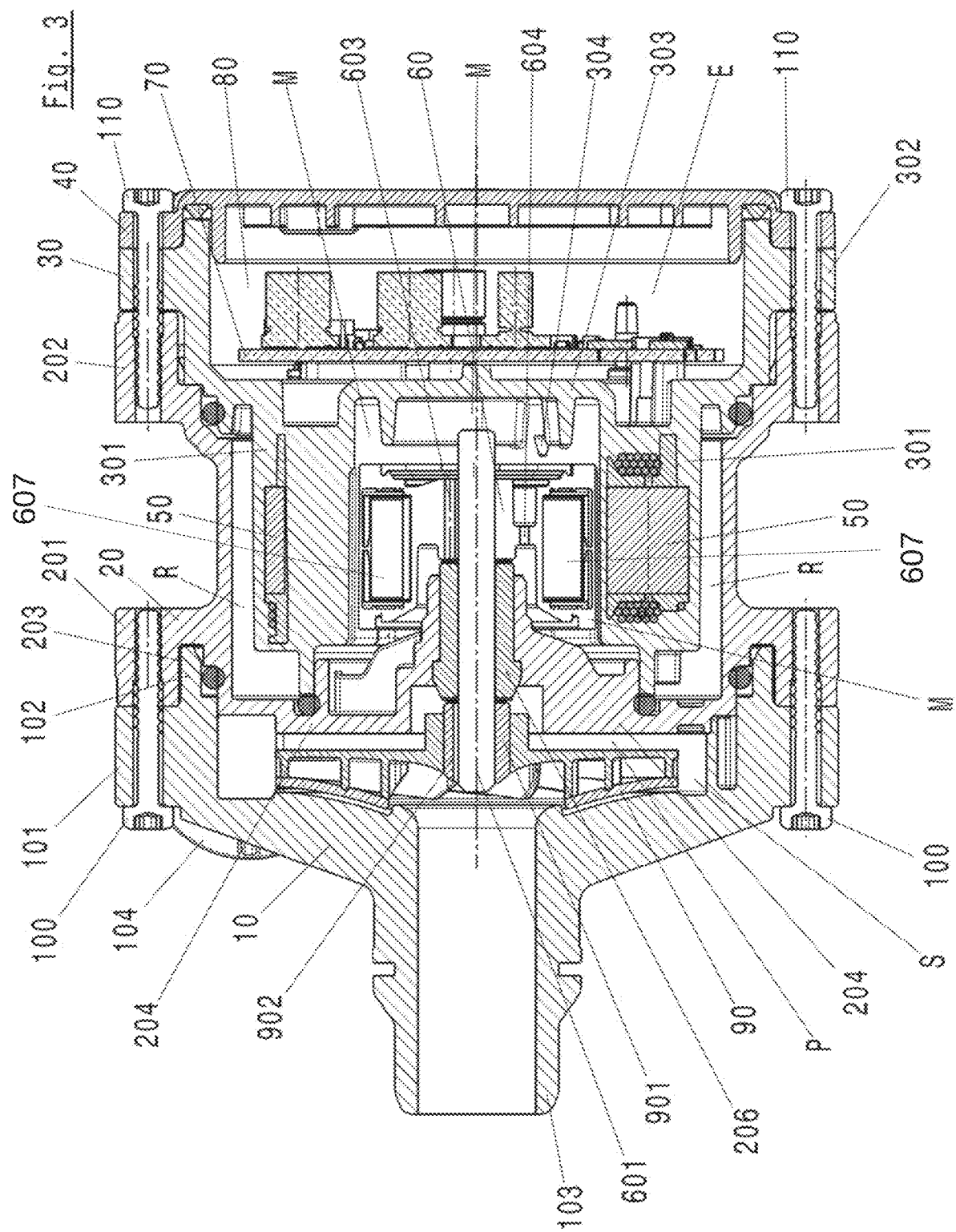
FIG. 3 is a longitudinal section through the first pump.
Figure 4:
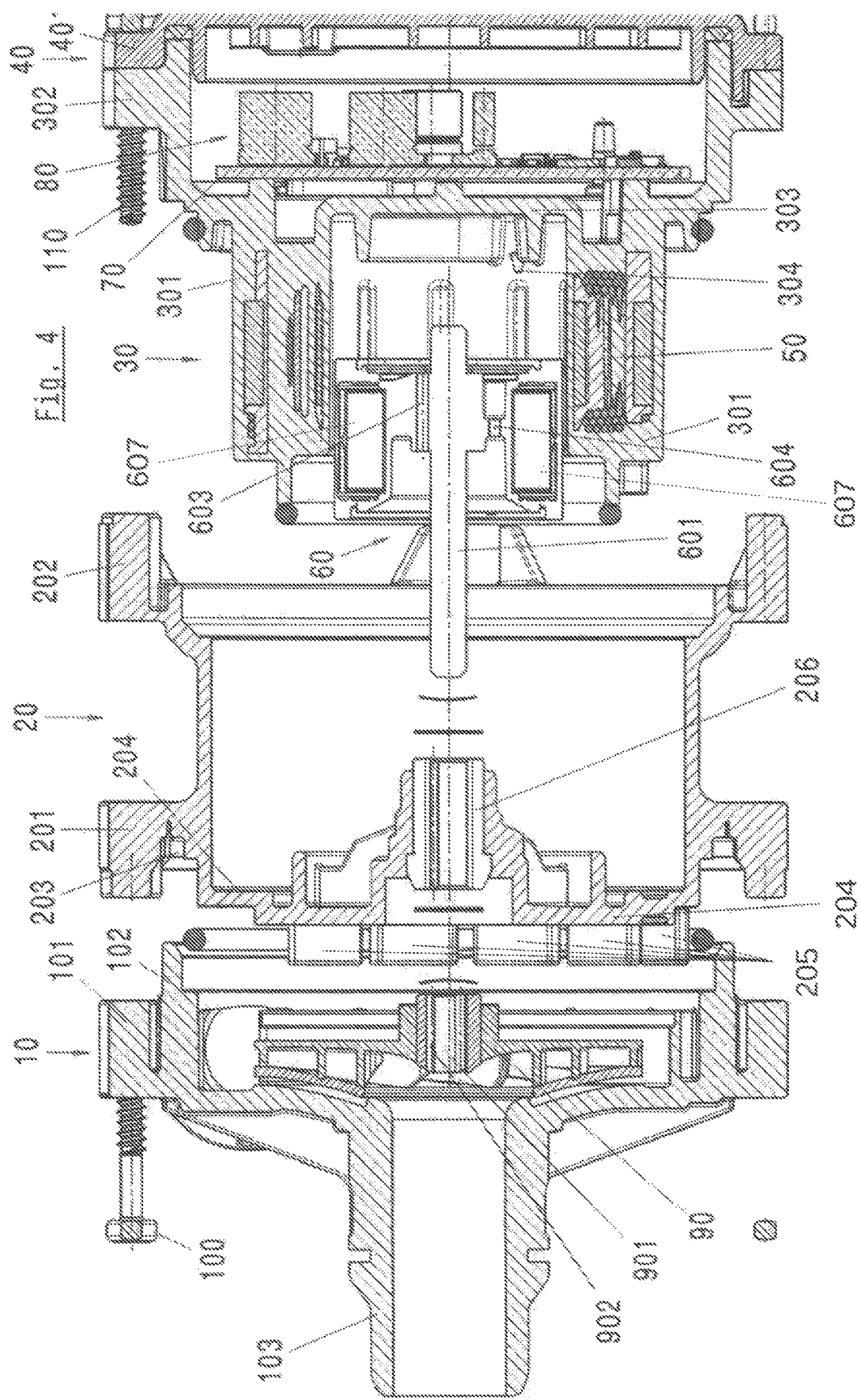
FIG. 4 is a longitudinal section through the first pump in an exploded view.

An The inventive pumps illustrated in the figures are very similar and are only different in a few parts, or even only in one part. Thus, with reference to FIGS. 1 to 4 and 9 and 10, first the first pump illustrated according to the invention is described prior to discussing the differences between the second, third and fourth inventive pumps.

The first pump has a multi-part housing which has a pump housing 10, a motor housing 20, an electronics housing 30 and a cover 40, wherein a stator 50 of a motor of the pump is provided in the electronics housing 30. The motor of the pump is completed by a rotor 60 which is rotatably mounted to the motor housing 20 and dips into the stator 50. The stator 50 in turn dips into the motor housing 20. Furthermore, an interconnect device 70 is provided, on which an electronic circuit 80 is provided, via which the motor is supplied with electrical energy and is controlled. An electronics chamber E, in which the interconnect device 70 and the circuit 80 are arranged, is bounded by the electronics housing 30 and the cover 40 of the housing.

The housing parts can be made of plastic, for example Vyncolit. The stator 50 is molded in the electronics housing 30, preferably in a skirt 301 of the electronics housing 30.

The pump housing 10, the electronics housing 30 and the cover 40 each have a flange 101, 302, 401. The motor housing 20 has two flanges 201, 202, namely a first on the side facing the pump housing 10 and a second on the side facing the electronics housing 30 and the cover 40. By screws 100 passing through the flange 101 of the pump housing 10 into the first flange 201 of the motor housing 20, the pump housing 10 and the motor housing 20 are interconnected. By screws 110 passing through the flange 401 of the cover 40 and the electronics housing 30 into the second flange 202 of the motor housing 20, the cover 40 and the electronics housing 30 and the electronics housing 30 and the motor housing 20 are interconnected.

To achieve a more pressure-resistant connection between the pump housing 10 and the motor housing 20, the flange 101 of the pump housing 10 has a circumferential web 102 which positively engages in an annular groove 203 that is provided in the first flange 201 of the motor housing. As a result, an expansion of the pump housing 10 and of the motor housing 20 during operation of the pump due to the pressure prevailing there can be avoided or at least reduced.

The pump has an impeller 90 which is rotatably mounted in the pump housing 10 and which for that purpose is mounted on a shaft 601 of the rotor 60, which shaft protrudes into in the pump housing 10.

The pump housing 10 and a wall 204 of the motor housing, namely the wall that is protruded by the motor shaft 601, encloses a pump chamber P in which the impeller 90 is disposed. The pump chamber P can be connected via an intake port 103 of the pump housing 10 to a line through which the fluid to be pumped is suctioned in. The intake port 103 is arranged coaxially to an axis of rotation of the rotor 60.

Figure 5:
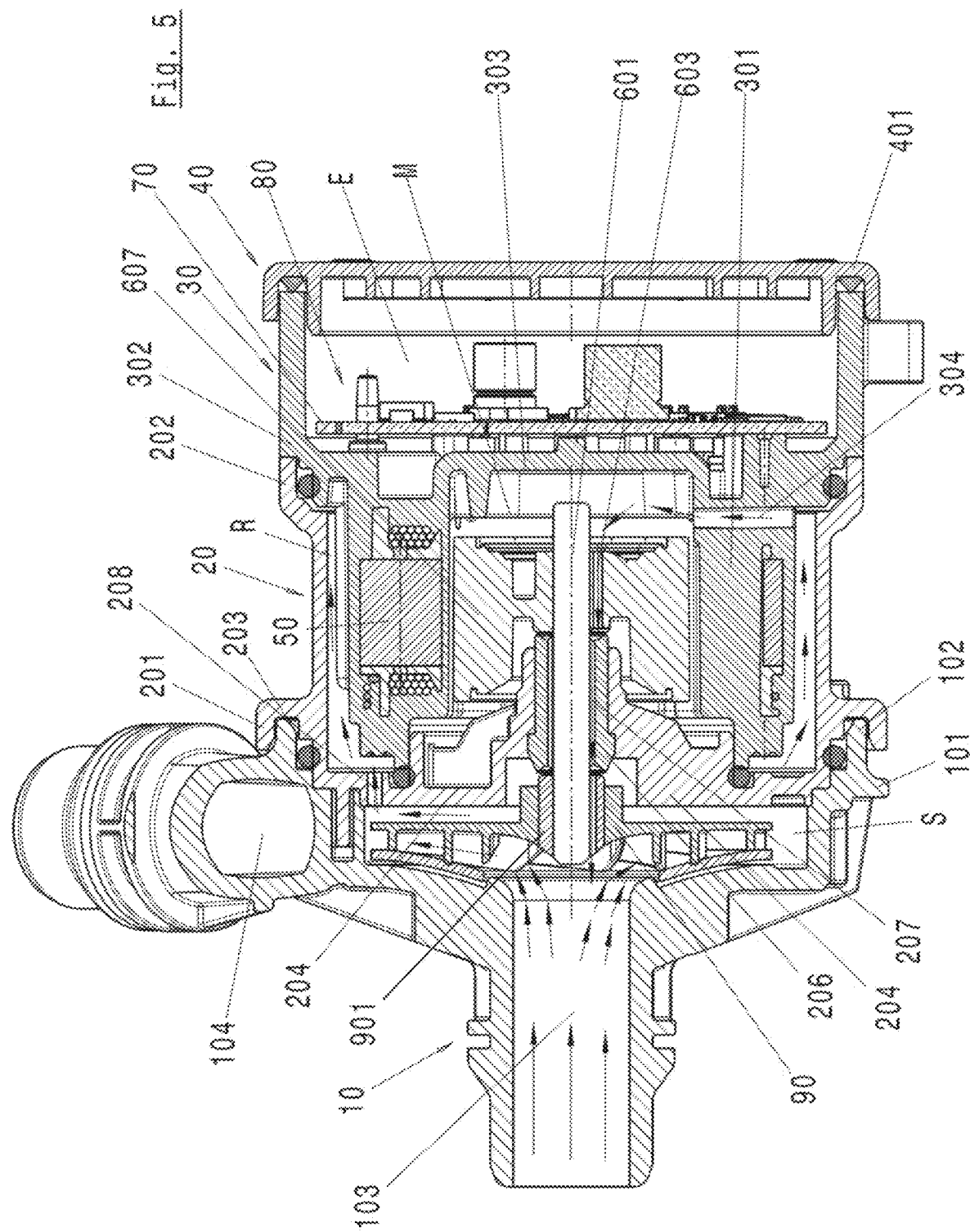
FIG. 5 is a longitudinal section through an exemplary second pump.

The pump chamber P can be connected via an outlet port 104 to a line into which the pumped fluid is pressed. An outer wall of the pump housing 10 and the impeller 90 define a spiral space S which spirally expands towards the outlet of the pump chamber. The impeller 90 is formed in a known per se, for example as illustrated in the document DE 10 2011 055 599 A1, FIG. 2, 3 or 5, in which for purposes of a more detailed explanation, an impeller 90 which can be used for an inventive pump is referenced.

The impeller 90 has a bush, preferably made of metal, with a center through hole into which the rotor shaft 601 is inserted so that the impeller 90 with the bush 901 is seated on the rotor shaft 601 in a torque-proof manner, preferably with a press fit. Parallel to the center through hole of the bush 901, the bush has one or more grooves 902 which, together with the rotor shaft 601, form through holes through which a fluid can flow from a side of the impeller 90 facing the motor housing 20 to a side of the impeller 90 facing the intake. In the example shown, there are three grooves 902.

To the extent of which the spiral space S of the pump chamber P widens spirally, the wall of the pump housing 10 radially limiting the pump chamber P tapers off. In this wall, there are recesses 105 which are open in the direction of the motor housing 20. In the examples shown in the figures, these recesses 105 are approximately the shape of a straight cylinder with a base area that resembles the sector of a circular ring. The base area of the cylinder in the examples shown is therefore similar to a sector of an annular ring because the inner walls of the recesses 105 follow the spiral shape of the radial bounding of the pump chamber P or the spiral space S of the pump chamber P. This results in recesses 105 tapering in the circumferential direction. Also resulting from this is that the recesses 105 differ.

Complementary to the recesses 105, protrusions 205 are provided on the wall 204 facing the pump housing 20 through which the rotor shaft 601 extends, which protrude into the recesses 105 when the pump is assembled.

Due to the recesses 105 and the complementary protrusions 205, the pump housing 10 and the motor housing 20 can only be assembled in one specific position when the pumps are installed.

A specific position of the pump housing 10 and the motor housing 20 could also be achieved in other ways.

The recesses 105 and protrusions 205 also have another effect. The area of the pump housing 10 and the motor housing 20, in which the recesses 105 or the protrusions are provided 205, separates the high-pressure area and the low-pressure area of the pump chamber P and of the spiral space S. These must be well sealed off against each other so that a fluid flow on the fluid circuit past the lines connected to the pump is prevented as much as possible, and the pump can operate as effectively as possible. If the protrusions 205 and the recesses 105 were not provided, instead, flat surfaces of the pump housing 10 and the motor housing 20 would lie next to each other. The protrusions 205 and recesses 105, however, create a kind of labyrinth seal which, even without an additional seal, provide an improved seal between the high-pressure area and the low-pressure area.

In the already mentioned wall 204 through which the rotor shaft 601 protrudes, a bush 206 is formed, which serves as a bearing for the rotor shaft 601. It is also possible that a bush 206 for mounting the rotor shaft is inserted in the aforementioned wall 204 and is firmly connected to the rest of the motor housing 20. The bush 206 has a through hole whose cross section is fitted to the rotor shaft 601. Axially in the wall of the through hole, one or more, preferably two grooves 207 (not visible in FIG. 3) are provided through which, when the rotor shaft 601 is inserted, a fluid can flow between the pump chamber P and a motor chamber M bounded by the motor housing 20 and the skirt 301 and vice versa. Small amounts of the fluid conveyed through the grooves 207 are carried along by the shaft 601 at a rotation of the rotor and provide for a lubrication between the rotor shaft 601 and the bush 206.

In the wall 204, which is penetrated by the rotor shaft 601, one or more through holes 208 are provided in the area of the spiral space S—in the illustrated examples, there are three through holes 208—which create a connection between the spiral space S and an annular chamber R bounded by the motor housing 20, the skirt 301 and an end wall 303 of the electronics housing 30. A fluid can be conveyed into the annular chamber R through the through holes 208 from the spiral space, which is located on the high-pressure side of the impeller 90.

The annular chamber R is connected to the motor chamber M by one or more radial through holes 304 in the skirt 301. The through holes 304 are provided in the vicinity of the end wall 303. A fluid which crosses from the annular chamber R into the motor chamber M can be conveyed through the motor chamber M, for example through a gap between the rotor 60 and the skirt 301 to the side of the motor chamber M facing the rotor 60 of the pump chamber P. By the aforementioned grooves in the bush 206 of the rotor shaft 601 and the grooves 902 in the bush 901 of the impeller 90, the fluid can be conveyed to the intake side of the impeller 90, that is to say to the low-pressure side of the impeller 90. Thus, there is a continuous connection between the spiral space S, i.e. the high-pressure side of the pump chamber P, through the through holes 208 between the spiral space S and the annular chamber R into the annular chamber R, and from there, through the through holes 304 between the annular chamber R and the motor chamber M into the motor chamber M, from the motor chamber M via the grooves 207 in the bearing bush 206 and the grooves 902 in the bush 901 of the impeller 90 to the intake side of the impeller 90, of the low-pressure side of the pump chamber P. When the pump is operating, a flow of fluid is created along this path, which is definitively smaller than the flow conveyed by the pump to the outlet, but is so large that it can achieve adequate cooling of the pump at a rated operation.

When cooling the pump by means of a fluid flow along the described flow path, in particular in a space between the rotor 60 and the end wall 303 of the electronics housing 30, air may accumulate which is located in the fluid circuit, for whatever reason. The air collected in this space can hardly escape from this room or be pushed out of this room. When the pump is operating, both the fluid and the air in this space are set in rotation due to the movement of the rotor. The resulting centrifugal forces lead to a stratification in this space corresponding to the density of the media accumulated there. As a result, the air accumulates in the center of the room, while the fluid collects in the outer region and can be further conveyed from there through the annular gap between stator 50 and rotor 60.

The accumulation of air has disadvantages for the cooling of the pump, in particular for the cooling of the rotor 60 and the electronics circuit 80.

This can be remedied if the shaft 601 of the rotor 60 is provided with a central bore. This could stretch over the entire length of the shaft 60 and thus connect the space between the rotor 60 and the end wall 303 of the electronics housing with the low-pressure side of the pump chamber P. It is also possible that the central bore extends only from the end of the shaft 601 facing this space to the other side of the rotor 60. Via these longitudinal bores and transverse bores in the rotor shaft 601, air can then be transported from one side of the rotor 60 to the other side of the rotor. The air can take its further, already described path via the grooves 306 in the bearing bush for the rotor, to be guided to the low-pressure side of the pump chamber P.

Transporting the air through a central bore of the shaft 601 makes it necessary to produce the central bore and possibly the transverse bore, which is costly. Moreover, it must be taken into account that other properties of the shaft arise from the bores as compared to a shaft 601 made of solid material. This consideration of the other properties of the shaft can result in additional cost.

In the first to fourth pump in the figures, different variants are therefore selected.

In the first pump, in an area of the rotor between the shaft and the permanent magnet, first through holes 603 and second through holes 604 are provided. The first through holes 603 extend parallel to the shaft 601 in an area immediately adjacent to the shaft 601. The second through holes 603 are radially further away from the rotor shaft 601 and thus closer to the permanent magnet 607. Both through holes connect a space of the motor chamber on a first side of the rotor and a space of the motor chamber on a second side of the rotor.

The first through holes 603 have the advantage that they begin more in the center of rotation and thus also more in the center of the accumulating air. This can ensure that no large air bubble forms. However, the first through holes 603 have the disadvantage that the rotor body 602, which encloses the permanent magnet 607 and through which the rotor shaft 601 is guided, is weakened by means of the first through holes 603 in an area in which there is little material available. This leads to low wall thicknesses of the rotor body 602 in the area of the first through holes 603, which must be given special consideration. The rotor body 602 is preferably made of plastic.

The second through holes 604 are surrounded by more material, which has structural advantages over the first through holes 603. However, the air cannot be discharged as well through the second through holes 604 as through the first through holes 603.

Figure 6:
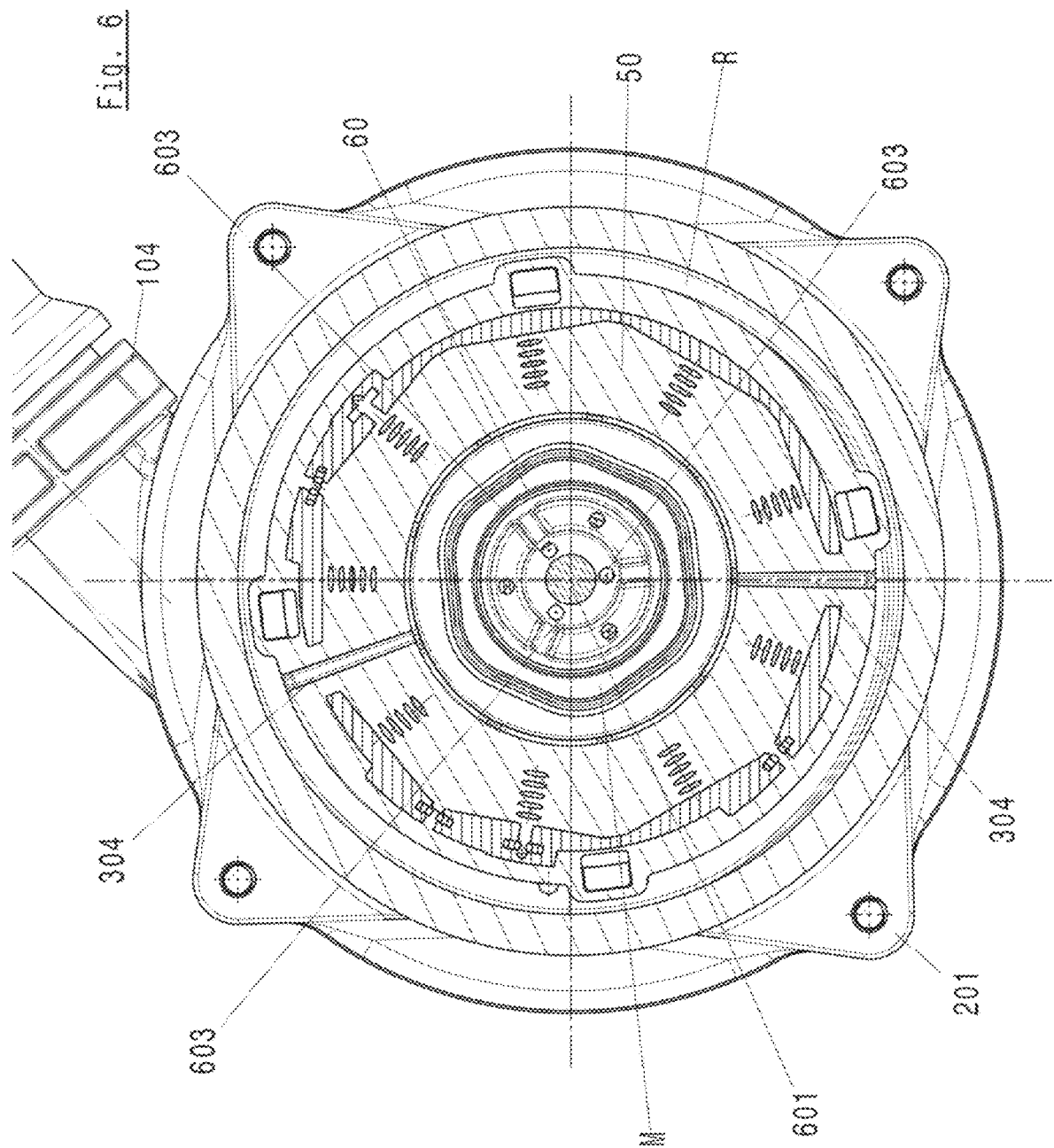
FIG. 6 is a cross section through the second inventive pump.
Figure 7:
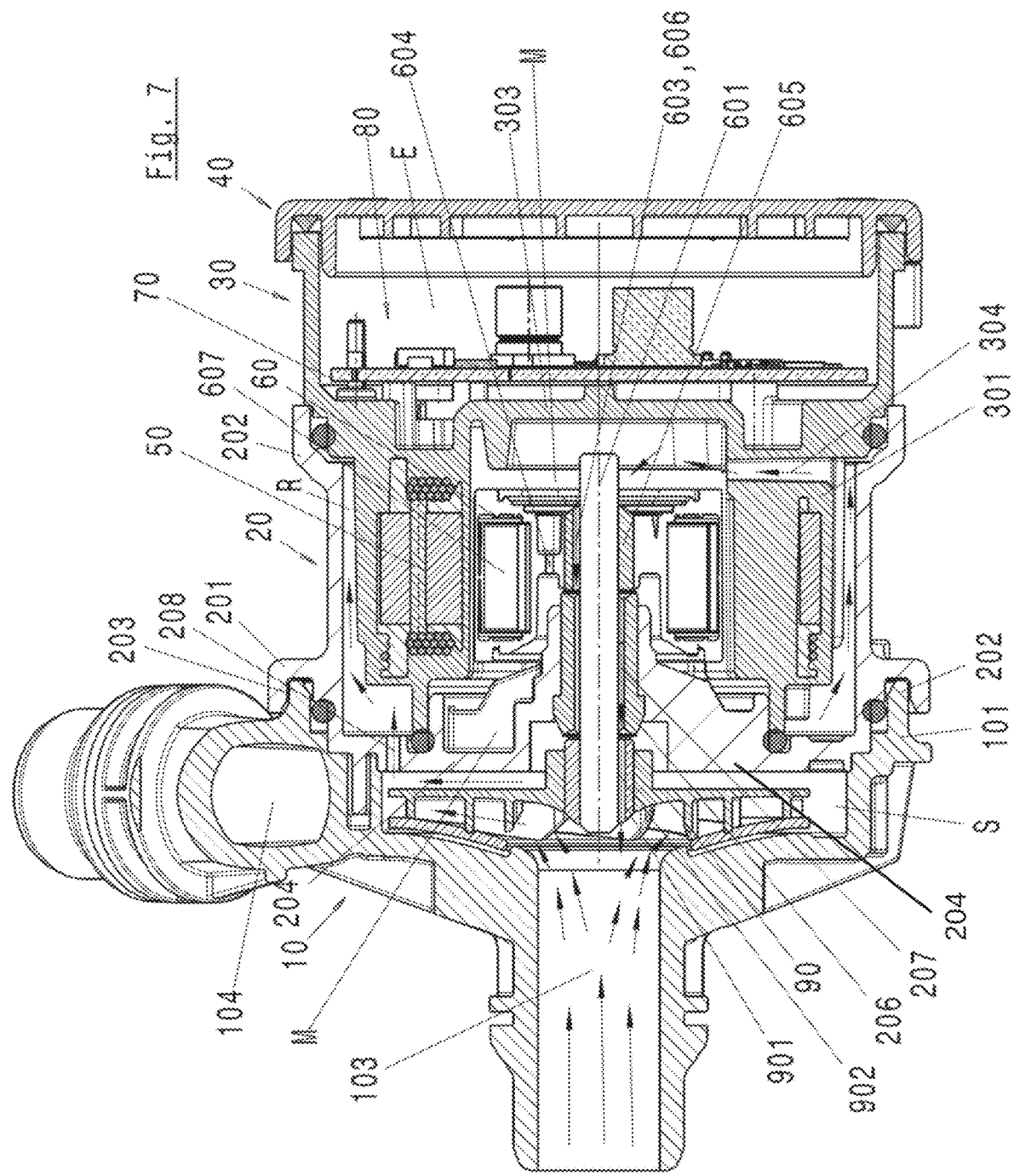
FIG. 7 is a longitudinal section through an exemplary third pump.
Figure 8:
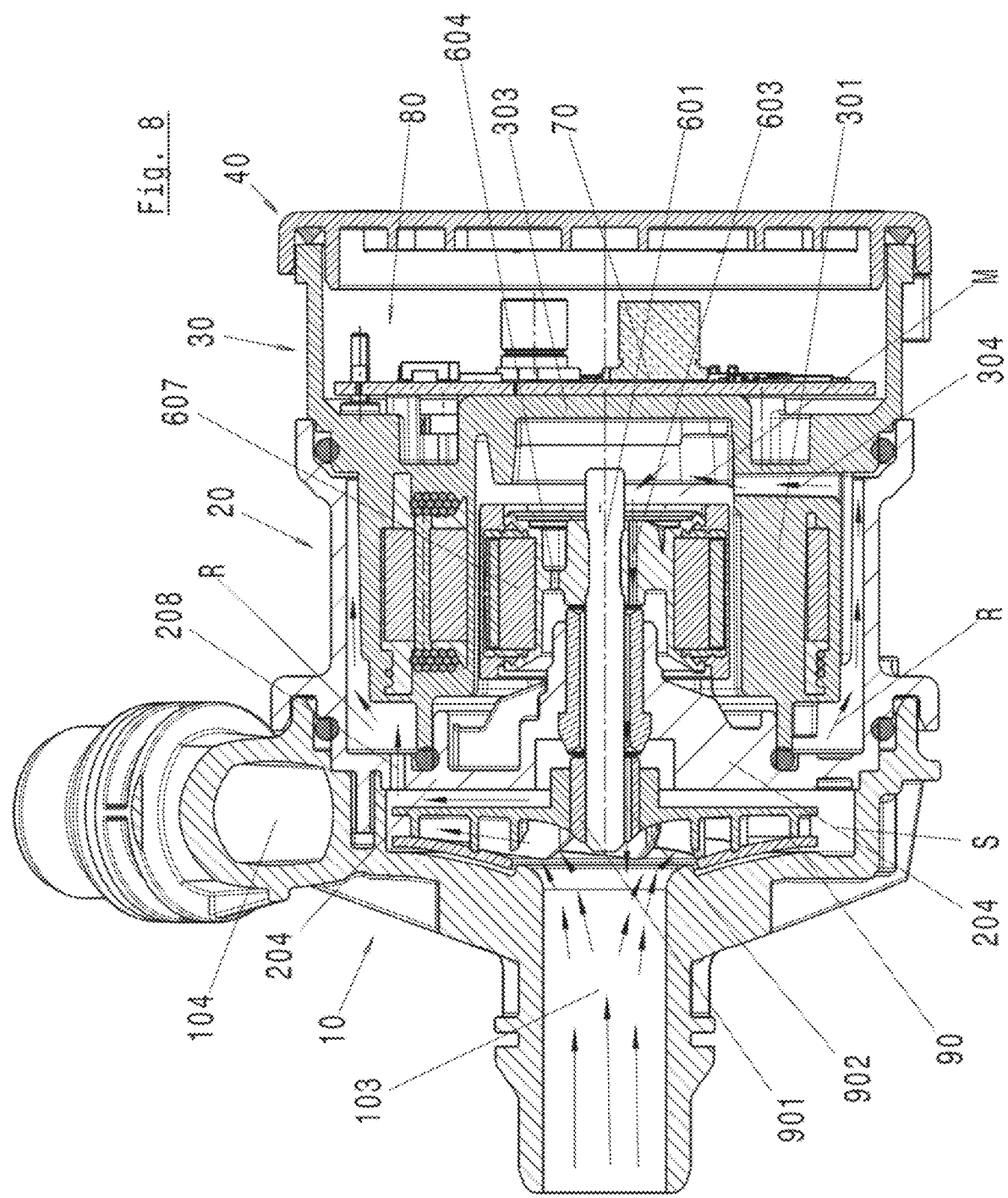
FIG. 8 is a longitudinal section through an exemplary fourth pump.

It is possible that in pumps according to the invention, the first and second through holes 603, 604, as shown for the first pump according to the invention (FIGS. 3 and 4) and the fourth pump according to the invention (FIG. 8), only the first through holes 603, as shown for the second pump according to the invention (FIGS. 5 and 6), or only the second through holes 604 are provided.

The first and fourth pumps differ, among other things, by the rotor shaft 601. While the second pump has a smooth, circular cylindrical shaft 601, the rotor shaft 601 of the fourth pump has constrictions and shoulders, which cause an improved connection between the shaft and the rotor body 602, which envelops the permanent magnet 607.

The third pump presents a different solution for through holes for venting the space between rotor 60 and end wall 303 of the electronics housing 30. For this solution, a bush 605 is provided between the rotor body 602 and the shaft 601, which corresponds to the bush 901 of the impeller 90 and is preferably identical to the bush 901 of the impeller 90. The shaft 601 is smooth and circularly cylindrical. By using identical bushes 605, 901 for the impeller 90 and the rotor 60, i.e. by using identical parts, several advantages can be achieved. The rotor 60, as also the impeller 90, has grooves 902, 606 that are provided for the coolant flow which are guided close to the rotor shaft 601. This offers the possibility of improved ventilation for the coolant flow through the rotor 60 without the shaft 601 having to be specially designed for this purpose. The grooves allow for through holes, which are guided very close to the axis of rotation, without the need for the rotor body 602 enveloping the permanent magnet 604 to be weakened in an area in which little material is available.

An advantageous feature of the fourth inventive pump, which can also be provided in all other pumps according to the invention, is that the side of the end wall 303 of the electronics housing 30 facing away from the motor chamber M is flat. This makes it possible for the interconnect device 70 carrying the electronic circuit 80 to lie flat against this side of the end wall 303. Preferably, the interconnect device 70 can be glued to this side of the end wall 303, preferably with an adhesive that conducts heat in a special way and thus transports circulated fluid from the circuit 80 or the interconnect device 70 on the one side via the end wall 303 into the motor chamber M. Fastening by other means could then be omitted. If a detachable fastening of the interconnect device in the electronics housing is preferred, this can be carried out via a detachable fastenor. In order to still achieve a good heat transfer from the interconnect device 70 into the end wall 303, a thermal paste can be provided between the interconnect device 70 and the end wall 303.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pump for a fluid circuit in a vehicle, the pump comprising:
    a multi-part housing that has a pump chamber and a motor chamber; and an impeller disposed in the pump chamber that is driven by a rotor arranged in the motor chamber, the rotor having a rotor shaft and a rotor body through which the rotor shaft is guided,
    wherein the rotor has through holes that directly interconnect a space of the motor chamber on a first side of the rotor with respect to an axial direction of the rotor shaft and a space of the motor chamber on a second side of the rotor with respect to the axial direction of the rotor shaft, and
    wherein all of the through holes are provided in a region of the rotor outside the rotor shaft, wherein one or more of the through holes, which interconnect the space of the motor chamber on the first side of the rotor and the space of the motor chamber on the second side of the rotor, are at least partially bounded by the rotor shaft,
    wherein the space of the motor chamber on the first side of the rotor and the space of the motor chamber on the second side of the rotor are provided outside of a through hole of the rotor body in which the rotor shaft is arranged, and
    wherein the housing has an annular chamber which surrounds a stator.

2. The pump according to claim 1, wherein the rotor has a bush which is provided between the rotor shaft and the rotor body, wherein the bush has a through hole in which the rotor shaft is arranged, and wherein the rotor body has the through hole in which the bush is arranged.

3. The pump according to claim 2, wherein grooves are provided in a wall of the through hole through which the rotor shaft is arranged, or in a wall of the through hole into which the bush is arranged, or in an outer wall of the bush, and wherein walls of the grooves and the rotor shaft, the bush and / or the rotor body bound the through holes which interconnect the space of the motor chamber on the first side of the rotor and the space of the motor chamber on the second side of the rotor.

4. The pump according to claim 1, wherein there is a fluid connection between the pump chamber or between a high-pressure side of the pump chamber and the annular chamber.

5. The pump according to claim 4, wherein there is a fluid connection on the first side of the rotor between the annular chamber and the space of the motor chamber on the first side of the rotor.

6. The pump according to claim 1, wherein the housing has an electronics chamber, wherein an electrical circuit is provided in the electronics chamber with which the motor is supplied with electrical energy, controlled and/or adjusted, wherein a wall is provided which separates the motor chamber from the electronics chamber, wherein the wall has a wall side bounding the electronics chamber against which an interconnect device for the electrical circuit is provided.

7. The pump according to claim 1, wherein the pump is a coolant pump.

8. The pump according to claim 1, wherein all of the through holes are provided in the region of the rotor outside the rotor shaft, such that all of the through holes are provided in the rotor body and are not provided in the rotor shaft.

9. The pump according to claim 1, wherein there is a fluid connection between the space of the motor chamber on the second side of the rotor and the pump chamber or a low-pressure side of the pump chamber.

* * * * *